April 5, 1932.   L. R. SMITH   1,851,992
HOSE COUPLING
Filed Feb. 15, 1930
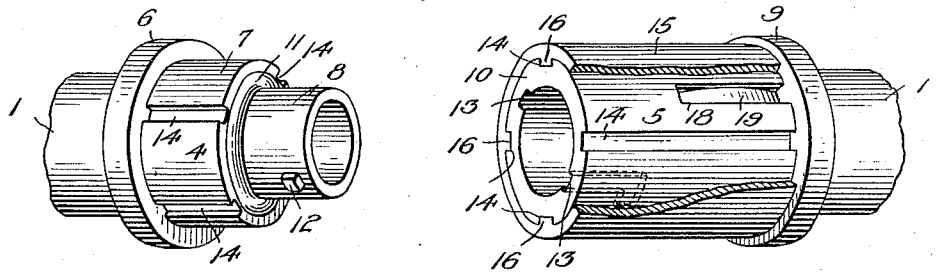
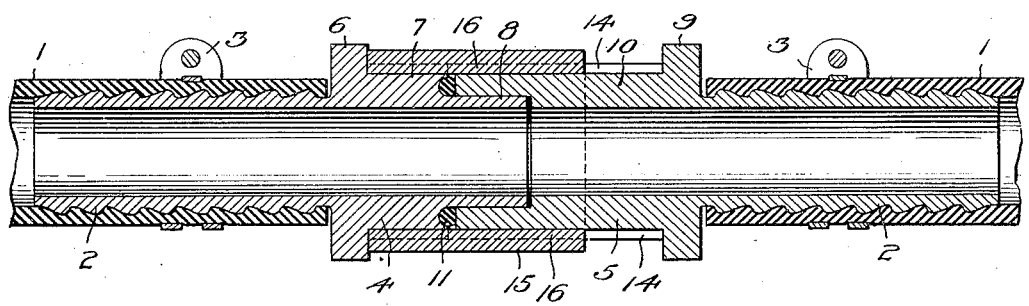
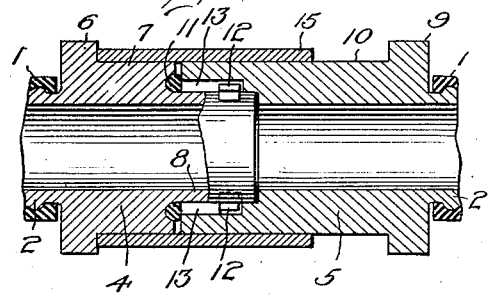 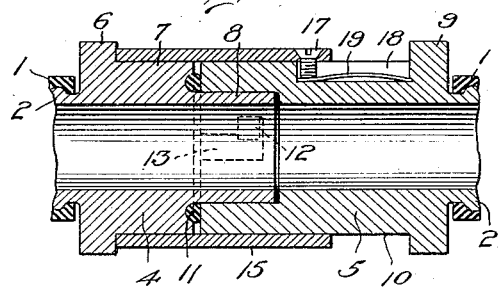
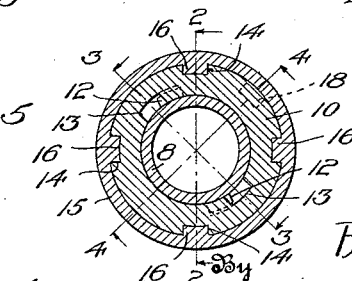
Witness
Edwin L. Bradford
Inventor
Louis R. Smith
By Dyre and Kirchner
Attorneys Patented Apr. 5, 1932

1,851,992

UNITED STATES PATENT OFFICE

LOUIS R. SMITH, OF HAWTHORNE, NEVADA

HOSE COUPLING

Application filed February 15, 1930. Serial No. 428,813.

My invention relates to hose or pipe couplings, and more particularly to means for connecting together the ends of lines designed to carry a fluid under pressure where it is necessary frequently to make and break the connection.

One object of my present invention is to provide a coupling of the character indicated which is adapted for use on either flexible hose or relatively rigid pipe which will effect a positive and secure connection incapable of being accidently parted when the hose or pipe is dragged over the ground.

Another object is to provide in a pipe or hose coupling a gasket interfitted between two complemental parts of the coupling where it will effectually prevent leakage of the fluid but will be protected alike from external injury and from the direct action of the fluid carried by the hose.

A further object is to provide a coupling which, when its parts are engaged together, will present to the contained fluid an almost unbroken smooth inner surface and consequently offer a minimum of resistance to the passage of the fluid through the line.

Another object is to provide a coupling which will combine unusual durability and efficiency with cheapness of manufacture and simplicity of operation.

Another object is to provide a coupling having a plurality of independently actuated, but mutually coacting, locking members, which must be successively disengaged to permit of separation of the pipe sections united by the coupling, whereby the force of the pressure inside the pipe and accidental external influences are rendered ineffectual in separating the pipe sections.

Other and further objects and advantages will sufficiently appear from the description hereinafter of the invention in one preferred form of embodiment, taken in connection with the accompanying drawings which form part of this application for Letters Patent and on which the same reference characters designate corresponding parts in the several views.

In the drawings:

Figure 1 is a perspective view, partly broken away, showing in disconnected relation the two assemblies which constitute my coupling;

Fig. 2 is a longitudinal central section of two lengths of hose and a coupling connecting them, taken on the line 2—2 of Fig. 5;

Fig. 3 is a longitudinal central section of the coupling taken on the line 3—3 of Fig. 5;

Fig. 4 is a longitudinal central section of the coupling taken on the line 4—4 of Fig. 5; and Fig. 5 is a transverse section taken through the coupling and showing its complemental parts in connected relation.

Referring to the drawings, the reference numeral 1 indicates two sections of a fluid pressure carrying conduit of any size, contour and material. For purposes of illustration I have shown the conduit in the form of a tubular rubber hose. Into the two ends of the hose which are to be made readily engageable and disengageable are fitted the circular barbs or corrugated tubular extensions 2 of the coupling members. The extensions may be held in place in the hose by force of friction alone, or if required, ordinary hose clamps 3 of wire or sheet metal may be used. It is to be understood, of course, that if the conduit 1 is a metal pipe, a screw threaded relation may be provided to secure its connection to the coupling extensions 2, in an obvious manner.

Integral with one of the conduit engaging extensions 2 is the male member of the coupling, designated generally in the drawings by the reference numeral 4. The other extension is integral with a complemental female member 5. Referring now to the male member, and especially to the view thereof in Fig. 2, at the inner end of the extension 2 a circular flange 6 of relatively great diameter is provided, which serves to limit the extent of the reception of the hose 1 by the extension 2, and has other purposes which will presently be described.

Adjacent to the flange 6, the male member is provided with a cylindrical portion 7 which is greater in axial length, but smaller in diameter than the flange 6, and at the extreme inner end of the member there is provided a cylindrical end portion 8 of still further reduced diameter, but of substantially the same length as the portion 7.

The female member 5, like the male member 4, is provided with a circular flange which in this member is designated 9. Inwardly of the flange 9, the female member is provided with a cylindrical portion 10 of a diameter equal to that of the portion 7 of the male member. The axial length of this portion 10, however, is equal to the combined lengths of the portions 7 and 8 of the male member. At its extreme inner end the cylindrical portion 10 is recessed, that is to say, its bore is enlarged sufficiently to admit the end portion 8, but the axial length of the recess is slightly less than the length of the end portion 8 which it receives.

An annular gasket 11 of any suitable packing material is carried by the portion 8 preferably in a suitable annular groove, at its junction with the portion 7, and this gasket is related in size to the other parts of the coupling so that when the male and female members are united, as shown in Fig. 2, for example, the inner end of the portion 8 will almost but not quite penetrate to the end of the recess in portion 10 when the gasket 11 is tightly compressed.

I provide means for maintaining the two members of the coupling in their connected relation as follows:

The cylindrical portion 8 of the male member is provided with a small square lug 12 on its outer surface, and the inner surface of the portion 10 of the female member is provided with two communicating slots 13, one parallel with the axis of the member and the other at right angles thereto, both slots being of the same width and depth as the lug 12. It will be appreciated that the lug and the slots thus form a modified type of bayonet lock and that the two members of the coupling may be united by slipping the portion 8 inside of portion 10, the lug 12 entering the axial slot 13. When completely engaged, the members are given a fractional relative rotation to receive the lug in the short right angled slot and the members are locked securely together with the gasket 11 compressed on the portion 8 between the portions 7 and 10, as clearly shown in Figs. 2, 3 and 4.

While a single lug 12 and a single pair of communicating slots 13 would suffice, I prefer to provide a pair of lugs and two pairs of communicating slots, disposed at diametrically opposite points on the portions 8 and 10, respectively, as shown in the drawings.

In order to prevent accidental disengagement of the members 4 and 5 when in their united position as just described, I provide an additional locking means as follows:

Channels 14 are provided in the outer peripheries of portions 7 and 10 in any convenient number, say four, as shown in the drawings. The channels in these two portions are adapted to register when the members have been given the slight relative rotation necessary to engage the lug 12 in the right angled slot 13.

It will be evident that when the parts are properly proportioned, as above specified, the portion 8 will penetrate almost to the limit of the recess in the portion 10, so that the inner surface of the engaged coupling members will be substantially smooth and unbroken, presenting consequently a minimum of resistance to the flow of fluid through the coupling. It will be evident also that the gasket 11 is positioned out of direct contact with the fluid in the pipe and is therefore protected from attrition by the movement of the fluid through the pipe. The only wear on the gasket will result from the fractional rotation of the portion 10 on the gasket, and I have found that this wear is negligible in practice. Any particles of the gasket material which are abraded by this rotation are prevented from contaminating the fluid by the relatively tight fit of the portion 8 in the recess.

An outer sleeve 15 is carried by the portion 10, and is formed with inner ribs 16 which are received in the channels 14. The sleeve 15 is of such a length that when one end abuts against the circular flange 9, its other end is flush with the end of the portion 10. When, however, the two members are united by the lug and slot means as has been explained, the channels 14 in portions 7 and 10 will register and the sleeve 15 may be slid away from contact with the flange 9 to abut against the flange 6 on the member 4. In this latter position the inner ribs 16 engage simultaneously the channels 14 in both portions 7 and 10, so that the two members are securely held against relative rotation. Inasmuch as relative rotation of the members is necessary to effect their disconnection, it will be evident that the position of the outer sleeve 15 as shown in Figs. 2, 3 and 4 positively prevents disengagement of the two members of the coupling.

Air and water hoses, and other fluid lines with which my coupling is adapted to be used, are frequently dragged carelessly over the ground. To prevent accidental displacement of the outer sleeve 15 from its locking position under such conditions of use or abuse, I make the flanges 6 and 9 extend radially to an appreciable distance beyond the sleeve 15. I also provide additional securing means for the sleeve 15, in the form of a set screw or like inwardly extending projection carried by the sleeve, which rides in a pocket 18 in the portion 10 adjacent to the flange 9. A small flat spring 19 is fitted in the pocket 18 so that its mid-portion is slightly bowed upwardly to oppose movement of the set screw 17 from one end to the other of the groove 18. It will be apparent that this arrangement makes it necessary to apply a moderate degree of force to the sleeve 15 to move the same from its locking position to its unlocking position.

It is to be understood that the foregoing is a disclosure of my invention in one preferred form of embodiment. Various changes and modifications may be made in the physical coupling without departing from the spirit of my invention, and all such modifications, insofar as they exemplify my present invention, are to be deemed within the spirit thereof and within the scope and purview of the appended claims.

Having thus described my invention what I claim and desire to secure by Letters Patent is:

1. A hose coupling including a pair of members adapted when relatively rotated to be coupled together, outer peripheral flanges formed at the remote ends of the members, a channel provided in the outer surface of each of the members between said flanges and adapted to register when the members are coupled together, and means for locking the members against relative rotation when coupled together including a sleeve normally received over one of the members having a rib received in said channel and slidable over the other member when said channels are in register, a pocket formed in the member normally carrying the sleeve, a projection formed on the inner surface of the sleeve and extending into said pocket, and spring means in said pocket cooperating with the projection adapted to yieldingly maintain the sleeve in its locking position.

2. A hose coupling including a pair of members adapted when relatively rotated to be coupled together, a channel formed in the outer surface of each of the members adapted to be aligned when the members are coupled together, and means for locking the members against relative rotation when coupled together including a sleeve normally carried by one only of the members having a rib received in said channel and slidable over the other member to engage both channels simultaneously when said channels are aligned, a pocket formed in the member normally carrying the sleeve, a projection extending from the sleeve inwardly into the pocket, and spring means in the pocket cooperating with the projection adapted yieldingly to maintain the sleeve in its locking position.

3. A hose coupling as claimed in claim 2 in which the spring means is adapted also yieldingly to maintain the sleeve in its retracted position after the sleeve has been moved to its retracted position.

4. A hose coupling as claimed in claim 2 in which the spring means consists of a leaf spring positioned in the pocket and bowed upwardly in its mid-portion whereby the co-operating projection extending from the sleeve is urged to the nearest end of the pocket and the sleeve is resiliently maintained alternatively in locking or retracted position.

5. A hose coupling as claimed in claim 2 in which each of the members is provided with an outer flange spaced from the end of the member adapted to be coupled with the other member and in which the sleeve is smaller in diameter than the flanges.

6. A hose coupling as claimed in claim 2 in which each of the members is provided with an outer flange spaced from the end of the member adapted to be coupled with the other member, and in which the sleeve is shorter than the distance between the flanges when the members are coupled together.

7. A hose coupling as claimed in claim 2 in which each of the members is provided with an outer flange spaced from the end of the member adapted to be coupled with the other member, and in which the sleeve is substantially equal in length to the distance between the flange of the member which normally carries the sleeve and the end of said member adapted to be coupled with the other member.

8. A hose coupling as claimed in claim 2 in which each of the members is provided with an outer flange spaced from the end of the member adapted to be coupled with the other member, said flange being of greater diameter than the diameter of the sleeve, and in which the sleeve is substantially equal in length to the distance between the flange of the member which normally carries the sleeve and the end of said member adapted to be coupled with the other member.

In testimony whereof I affix my signature.

LOUIS R. SMITH.